US00RE38473E

(19) United States
(12) Reissued Patent
Smolenski

(10) Patent Number: US RE38,473 E
(45) Date of Reissued Patent: Mar. 23, 2004

(54) PRINTER WITH FLOATING PRINT HEAD WITH ALIGNMENT SURFACES TO POSITION PRINTHEAD

(75) Inventor: Lawrence E. Smolenski, Newbury Park, CA (US)

(73) Assignee: Zih Corp., Wilmington, DE (US)

(21) Appl. No.: 09/847,130

(22) Filed: May 3, 2001

Related U.S. Patent Documents

Reissue of:
(64) Patent No.: 6,068,415
Issued: May 30, 2000
Appl. No.: 09/189,557
Filed: Nov. 11, 1998

(51) Int. Cl.[7] ..... B41J 25/304; B41J 2/32
(52) U.S. Cl. ..... 400/120.16; 400/120.01; 347/197; 347/220
(58) Field of Search ..... 400/120.01, 120.02, 400/120.16, 120.17; 347/197, 198, 220, 222, 200

(56) References Cited

U.S. PATENT DOCUMENTS 4,641,980 A * 2/1987 Matsumoto et al. ..... 346/136
4,718,785 A * 1/1988 Spath ..... 400/120.16
4,725,853 A * 2/1988 Kobayashi et al. ..... 347/197
5,139,351 A * 8/1992 Kamada ..... 358/296
5,150,130 A * 9/1992 Sato ..... 101/288
5,304,007 A * 4/1994 Flanagan ..... 347/197
5,694,159 A * 12/1997 Kajiya et al. ..... 347/197
5,746,519 A * 5/1998 Ricketts ..... 400/120.01
5,779,371 A * 7/1998 Aoyama et al. ..... 347/197

FOREIGN PATENT DOCUMENTS

JP 03-175056 * 12/1989
JP 3-292158 * 12/1991
JP 4-43048 * 2/1992
JP 4-223185 * 8/1992
JP 4-296569 * 10/1992
JP 08-051514 * 8/1994

* cited by examiner

*Primary Examiner*—Leslie J. Evanisko
(74) *Attorney, Agent, or Firm*—Fulbright & Jaworski

(57) ABSTRACT

A printhead assembly for a printer with the printhead mounted in the lid of the printer and the platen mounted in the body of the printer. The printhead is spring loaded, permitting it to float in both the vertical and horizontal directions within the lid assembly. Guideposts are located in the body of the printer with a defined positional relationship to the platen. When the lid is closed, the guideposts position the printhead in its correct position with respect to the platen. Mounting the printhead in the lid and the platen in the printer body permits new paper to be loaded quickly and easily by simply pulling the paper past the platen and closing the lid. The cumbersome paper-threading procedure of conventional inexpensive printers is avoided.

16 Claims, 4 Drawing Sheets

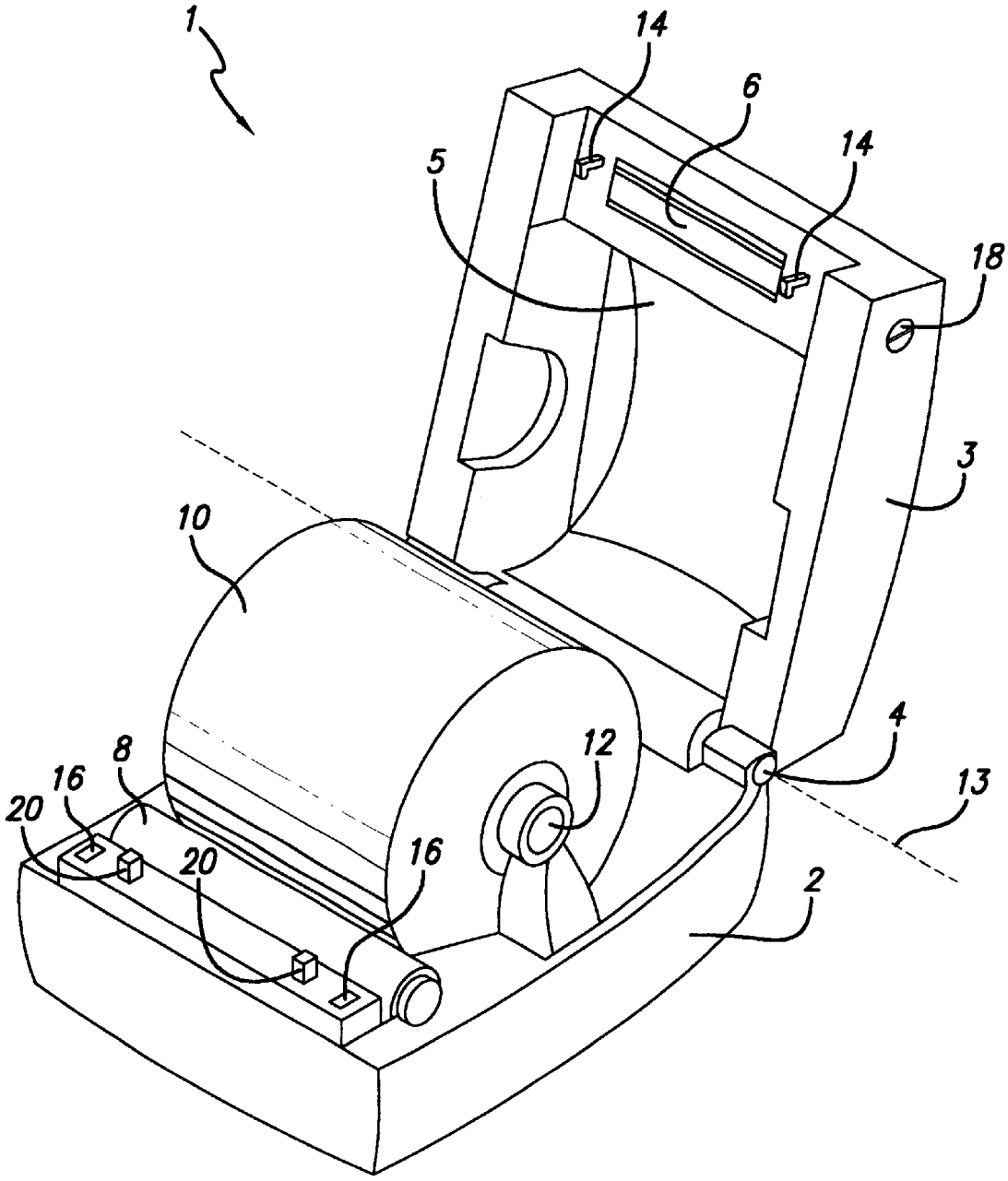
FIG. 1
[AMENDED]

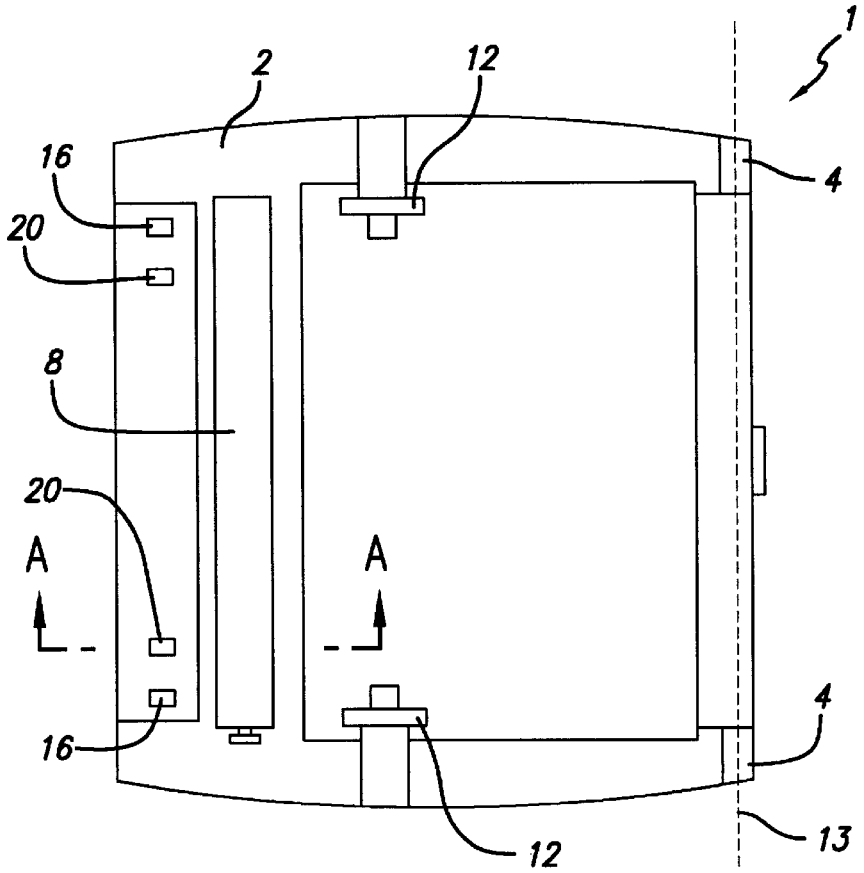
FIG. 3
[AMENDED]

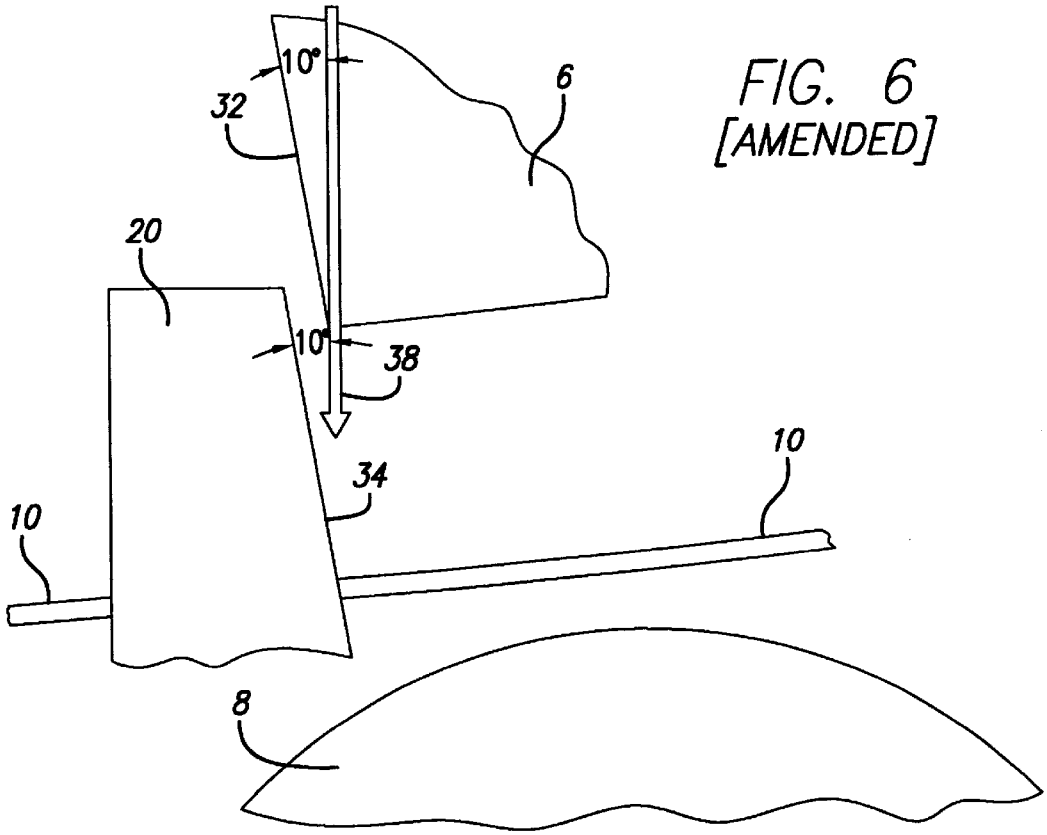
FIG. 6
[AMENDED]
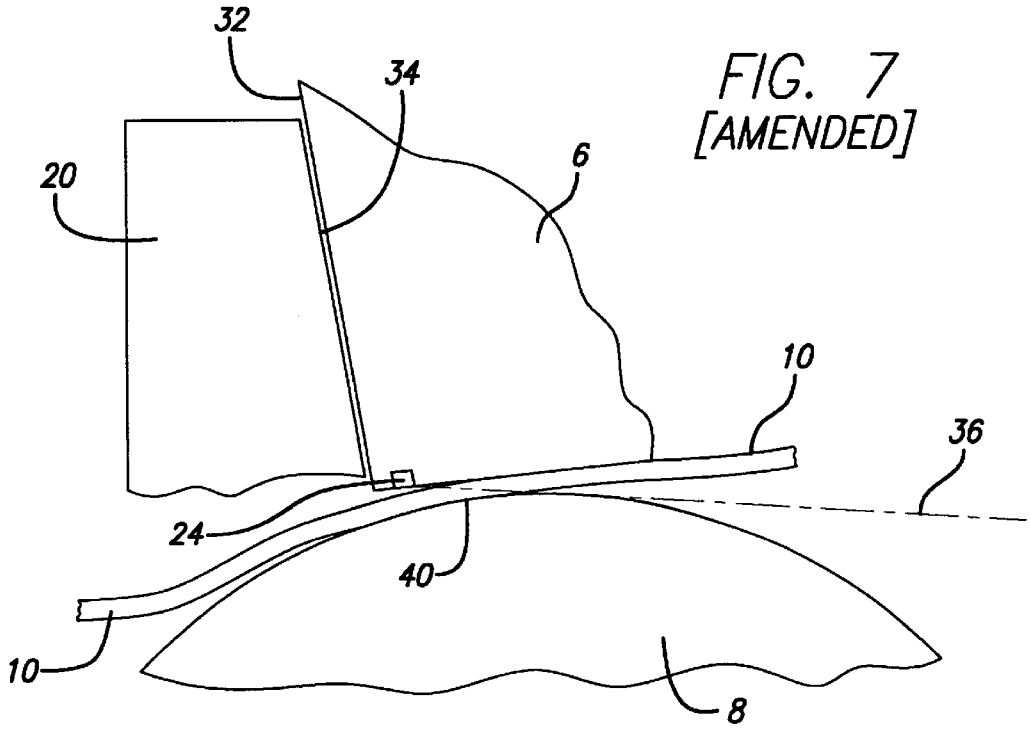
FIG. 7
[AMENDED]

PRINTER WITH FLOATING PRINT HEAD WITH ALIGNMENT SURFACES TO POSITION PRINTHEAD

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a print head mechanism in a printer. More particularly, it relates to a floating print head mechanism attached to the printer lid so that new paper can be loaded into the printer without the cumbersome procedure of threading the paper through the print mechanism.

2. Description of the Related Technology

Printers are available in many different configurations utilizing a variety of technologies. The choice of the best features and technologies for a particular application depends on a number of factors including cost, print speed, print quality, durability and operating expenses. Regardless of the type of technology used, however, most printers have three elements in common: 1) a print head located on the side of the paper to be printed; 2) a platen located on the opposite side of the paper and providing physical support for the paper; and 3) a paper handling mechanism which moves the paper past the print head. In some cases the platen and the paper handling mechanism can be combined into a single roller which presses the paper against the print head and turns to advance the paper forward. This configuration is especially advantageous as it combines into a single item the functions of advancing the paper, providing a relatively hard surface against which the paper may be held, and maintaining the paper against the print head for a precision printing operation. Such rollers typically have a roller surface which is slightly compressible and which exhibits sufficient friction against the paper to move the paper with the required precision. Such rollers are well known in the printer industry and are not further described here.

Some printers will print on cut-sheet paper, which requires a complicated and expensive mechanism to pick up each new sheet and position it correctly underneath the print head. However, many inexpensive printers print on a continuous roll of paper or on a continuous stack of fan-fold paper. The low cost obtained by avoiding the use of the costly sheet-handling mechanism makes this approach ideal for such devices as label printers, adding machines, and point-of-sale receipt printers.

Maintaining print quality in roll-paper printers is usually accomplished by mounting the print head and the platen in a precise fixed relationship to each other, with the paper passing between them within a narrow space just large enough for the paper to pass through. However, when a new roll of paper must be inserted, this arrangement makes changing paper difficult. Not only must the user open the printer to access the paper space, but the user must also thread the new paper through the narrow space between the platen and the print head. This can be awkward and frustrating due to the cramped space allowed for the operator's hands, the difficulty of inserting new paper into such a small space, and the problem of getting the paper aligned once it has been inserted.

This problem has been partially addressed in some conventional printers by providing print head mechanisms which can be moved away from the platen a small distance, thus slightly enlarging the space through which the paper must be threaded. This can be accomplished with a mechanism that raises the print head vertically upward[s] from the platen. It can also be accomplished by placing the print head on a short pivoting arm. However, maintaining accuracy dictates that the pivot arm be comparatively short and rigid, and that the pivot be relatively tight. A non-rigid arm can flex, thus introducing inaccuracy into the position of the print head. A long pivot arm amplifies manufacturing tolerances, thus requiring more expensive manufacturing techniques. Either approach adds components to the print head area, raising the cost and complexity of the resulting assembly. If the pivot joint is too loose, which is common with inexpensive pivot mechanisms, this too can [create] *lead to* inaccuracy in the print head/platen alignment. Thus, conventional printers require a tradeoff between low cost and the inconvenience of having to thread paper through a confined space whenever new paper is inserted in the printer. What is needed is a print head mechanism[s] that allows new paper to be inserted easily and quickly without threading paper through a narrow space, and without the expense of additional complex close-tolerance components for enlarging that space.

SUMMARY OF THE INVENTION

The invention includes a printer comprising a base with an attached lid having an open position and a closed position, a platen coupled to the base, a printhead assembly coupled to the lid, such that the printhead assembly is disposed proximate to the platen when the lid is in the closed position and is disposed apart from the platen when the lid is in the open position. The method of aligning the printhead with the platen in the printer comprises the steps of closing the printer lid onto the printer base, moving the printhead towards the platen when the lid is being closed, and aligning the printhead with the platen by contacting a printhead alignment edge with a guidepost alignment edge immediately before the lid closes.

BRIEF DESCRIPTION OF THE DRAWINGS

FIG. 1 is a perspective view of the printer of this invention;

FIG. 3 is a top view of the base of the printer of FIG. 1;

FIG. 6 is a detailed view of the interaction between the printhead and the guideposts as the lid is closing; and FIG. 7 is a detailed view of the interaction between the printhead and the guideposts when the lid is closed.

DETAILED DESCRIPTION OF THE INVENTION

The invention solves the aforementioned problems with conventional printers by providing a print head which is located in the lid of the printer while the platen is located in the body of the printer. When the lid is opened to insert a new roll of paper, the print head and platen are completely separated. The leading edge of the paper can simply be pulled forward across the platen and the lid then closed to secure the paper and print head in their proper positions.

Using the same hinge to raise the lid and raise the printhead reduces, the parts count and cost of the printer. The required precision in the relative positions of the print head and platen are achieved through the use of a floating print head and precision guideposts which correctly position the print head when the lid is closed. Accurate positioning is relatively independent of the hinge and pivot arm materials. This permits the use of a comparatively loose hinge, located far from the printhead assembly. It also allows the supporting printer lid to be constructed of inexpensive materials with a degree of flexure that would otherwise be intolerable.

The print head 'floats' in two dimensions, i.e., it is only loosely constrained by the surrounding lid assembly. Horizontal positioning is controlled by moving the print head down past the guideposts until an angled surface of the printhead contacts a similarly angled surface of each guidepost. Further movement causes the angled surfaces to slide against each other until they are flush. This causes the print head to be pushed firmly against the side of the guideposts. Since the guideposts are attached to the same assembly as the platen, the position of the guideposts with respect to the platen can be manufactured with a high degree of accuracy. Since the print head can also be constructed with precise dimensions, the physical contact between the guideposts and the print head accurately places the print head in proper horizontal alignment with the platen. Vertical positioning is controlled by spring loading the print head in the vertical direction. When the lid is closed this spring pushes the print head down against the paper and the platen. The force of the spring maintains a constant pressure by the print head against the paper, thus pressing the paper down against the platen. This pressure keeps the print head in constant contact with the paper for precision printing and keeps the paper in constant contact with the platen for controlled advancement of the paper whenever the platen rolls forward.

Figure 2:
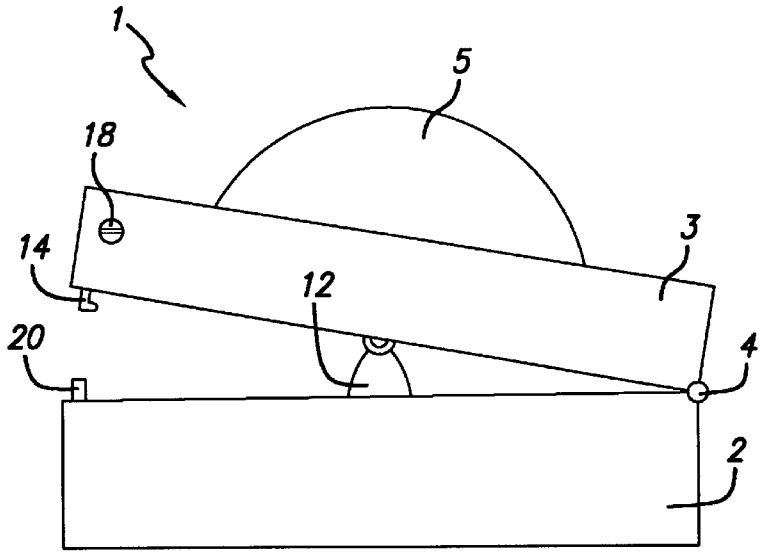
FIG. 2 is a side view of the printer of FIG. 1.

As shown in FIGS. 1–3, printer 1 includes a lid 3 supporting a floating printhead 6, a base 2 supporting platen 8 and alignment posts 20, and a hinge 4 for movably connecting lid 3 to base 2. Printer 1 can also contain more conventional items, such as print media 10, and latches 14 which interact with latch holes 16 to secure lid 3 to base 2 when lid 3 is in the closed position.

Figure 4:
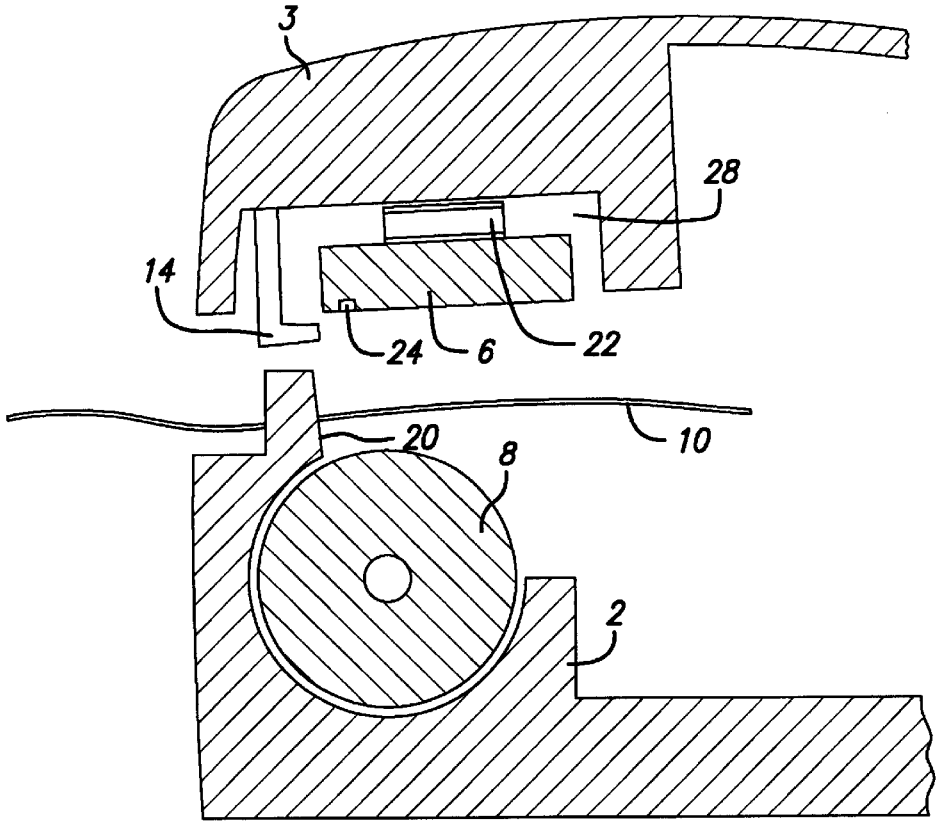
FIG. 4 is a cross-sectional view of the print head and platen assemblies with the lid slightly open, taken along the line A—A of FIG. 3.
Figure 5:
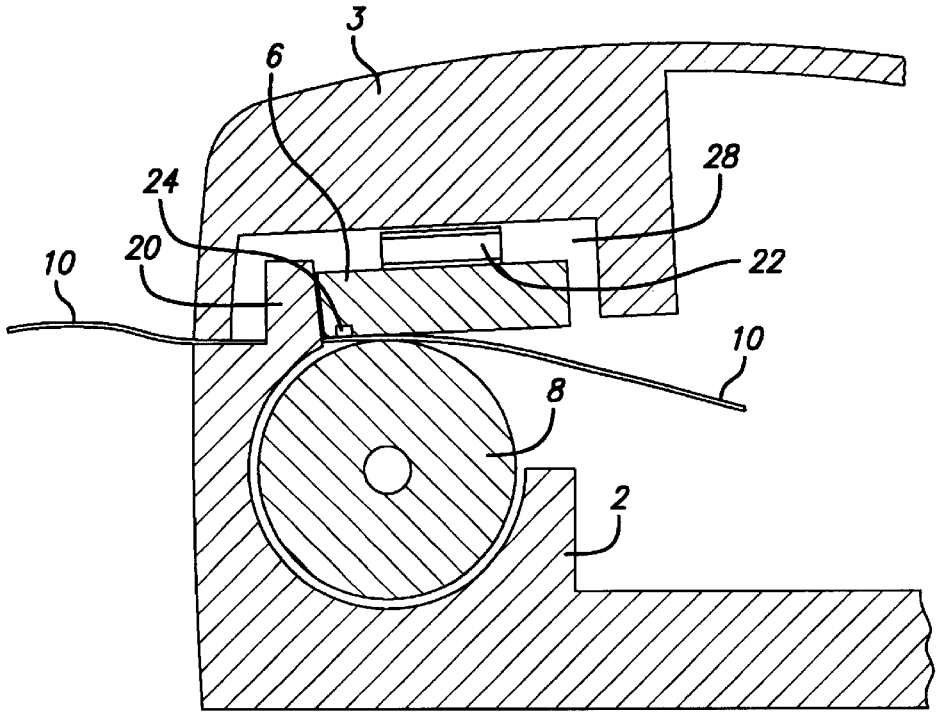
FIG. 5 is a cross-sectional view of the print head and platen assemblies with the lid closed, taken along the line A—A of FIG. 3.

FIGS. 4–6 show the relationships between printhead 6, platen 8, and guideposts 20. Spring-loaded printhead 6 floats in cavity 28. When lid 3 is closed and the bottom of printhead 6 is pushed against platen 8, the front edge of printhead 6 is seated against the back edge of alignment posts 20, which accurately places printhead 6 in the proper position, for printing. Placing the alignment edges of printhead 6 and alignment posts 20 at an angle to the direction of closure allows a certain amount of tolerance in the front-to-back positioning of printhead 6 relative to alignment posts 20 before lid 3 is closed. This tolerance allows comparatively low-tolerance manufacturing in the construction of lid 3, base 2, and hinge 4, which can reduce the overall cost of the printer.

FIG. 1 shows a preferred embodiment of the printer with the lid raised to more clearly show the relevant components. Printer 1 has a base 2 and a lid 3 attached to base 2 with hinge 4. Hinge 4 allows lid 3 to be opened as shown, exposing the internal parts and allowing the operator to gain access to paper roll 10. Paper roll 10 is supported by two paper holders 12, one of which is obscured in FIG. 1 by paper roll 10. These holders provide physical support to keep paper roll 10 in place but allow paper roll 10 to rotate as it feeds paper into the printing mechanism at the front of the printer. To permit larger rolls of paper to be used, lid 3 has a raised dome 5 which permits the lid to be closed even with a large roll of paper inserted in the printer.

When lid 3 is closed it is secured in position by latches 14 which are inserted into latch holes 16. Latches 14 can be standard spring-loaded latches which clasp the underside of holes 16 when the lid is closed but can be released by turning latch release 18, which is conveniently located on the side of lid 3. Printhead 6 is mounted in lid 3, while guideposts 20 are attached to base 2. Platen 8 is a roller assembly which is used to roll paper 10 forward past printhead assembly 6. Platen 8 can be controlled by an electric motor and associated electronic components (not shown).

FIG. 2. shows a side view of printer 1 with lid 3 in a slightly raised position. This view better illustrates the shape of raised dome 5, latch 14 and guidepost 20. Paper roll 10 has been removed in this figure for clarity.

FIG. 3 shows a top view of printer base 2 to more clearly illustrate the various components which are mounted on it. Lid 3 has been removed from the drawing for greater clarity. Paper holders 12 are mounted on both sides of the printer where they can be inserted into the core tube on both sides of the printer roll. The spacing between paper holders 12 is typically adjustable to accommodate various widths of paper. Platen 8 is a cylindrically-shaped roller which is long enough to accommodate the widest paper which the printer is capable of handling.

Latch holes 16 are located in the base so that latches 14 will be inserted into these holes when the lid is closed. Latches 14 will typically have an L shape as shown in FIG. 2 and will typically be spring loaded so that they will swing into the center of latch holes 16 as the lid is being closed but will snap back underneath the edge of hole 16 when the lid is fully closed. These latches keep the lid securely attached to the base during normal operation. Guideposts 20 are also shown attached to base 2. When lid 3 is closed the front edge of printhead 6 will be pushed against the back edge of guideposts 20, as will be described in connection with FIGS. 6 and 7, thus seating the printhead in its proper position.

FIG. 4 shows a cross section taken along the line "A—A" of FIG. 3, including lid 3 which is shown in a slightly raised position. An edge view of paper 10 can also be seen passing between printhead 6 and platen 8, as it will be when a new roll of paper is being loaded into the printer. When lid 3 is completely closed, printhead 6 will press paper 10 against platen 8 and these components will all be in position for printing. This configuration is shown in FIG. 5, which shows the same cross section as FIG. 4, but with the lid closed.

Platen 8 is a cylindrically shaped roller with suitable mounting at either end. During printing operations, platen 8 will rotate forward (counter clockwise in FIGS. 4 and 5) to move paper under the printhead and out the front of the printer. The rotation of platen 8 can be controlled by conventional electronic components which may be located partially or completely within the printer.

Printhead 6 is physically constrained within opening 28 of lid 3. Spring 22, which is preferably a leaf spring, exerts a downward force on printhead 6. Printhead 6 is limited in its downward travel by physical constraints which are typically at either end of printhead 6 and are therefore not shown in cross-section "A—A". Similar constraints may also be imposed to limit the travel of printhead 6 in the forward and backward directions. The use of such physical constraints is well known and is not described further.

Printhead 6 also contains print elements 24 which are typically arranged in a single row along the length of the bottom of printhead 6. A preferred embodiment uses a thermal printhead in which print elements 24 are composed of a single row of several hundred hearing elements per inch. Each element can be individually heated to cause a dark spot to appear on temperature-sensitive paper. By alternately moving paper 10 forward one dot width at a time and heating selected elements, a two-dimensional image may be created on the paper. Depending on the complexity of the associated electronics, this image may comprise numbers, letters, graphics, or other symbology. Other types of printhead technologies may also be used.

The precision alignment between printhead 6 and platen 8 is shown in FIGS. 6 and 7. Referring to FIG. 6, as lid 3 closes, printhead 6 descends in the direction of travel 38 indicated by the arrow. Direction of travel 38 is defined as the direction in which the printhead is moving immediately before the lid closes. This direction of travel actually forms an arc as lid 3 rotates around hinge 4. But the relevant portion of this arc, which in a preferred embodiment is approximately the last five degrees of travel before the lid closes, approximates a straight line and can be considered as such for a discussion of the alignment process. Direction of travel 38 is normal to *a* plane 36 (*FIG. 7*). Plane 36 is an imaginary reference plane defined by 1) a line running along [the] *a longitudinal* axis *13* of hinge 4, and 2) a point on the bottom of printhead 6 when lid 3 is closed. In the rectangular printer embodiment shown in FIG. 2, plane 36 appears horizontal when lid 3 is closed, but this would not be true if hinge 4 was placed higher or lower than shown, or if the printer were placed on a non-horizontal surface. However, since hinge 4 and printhead 6 are physical components of the printer which don't depend on horizontal or vertical orientations, the direction of arrow 38 can always be correctly defined by these two elements.

Alignment surface 32 of printhead 6 can be at an oblique angle of approximately 10 degrees from arrow 38. It might be more convenient to measure this as 80 degrees from plane 36, since plane 36 is defined by physical structure. In the embodiment shown, the entire printhead has been tilted forward. However, it is only important that the printhead alignment surface 32, in this case the front edge of printhead 6, be at an oblique angle. For reasons of manufacturing economy, a preferred embodiment uses the front surface of a rectangularly shaped printhead for alignment surface 32. However, other configurations could also be used, including a separate alignment structure that is rigidly attached to printhead 6. Alignment surface 34 of guidepost 20 is also tilted at an oblique angle with respect to direction of travel 38. In a preferred embodiment, alignment surface 34 is the back side of guidepost 20. When lid 3 is being closed, printhead alignment surface 32 approaches guidepost alignment surface 34 along direction of travel 38. The aforementioned oblique angles of the two alignment surfaces 32 and 34 allows for a certain amount of tolerance in the approach positions between the alignment surfaces 32 and 34, as measured by the amount that printhead 6 can be misaligned from front to back of the printer (left to right in FIG. 6) and still be correctly aligned when the lid is fully closed as shown in FIG. 7. It is important that surfaces 32 and 34 are flush with each other when the lid is fully closed, but while the lid is closing they can make first contact at any point after the bottom of printhead 6 passes the top of guidepost 20. As the lid is closed further, alignment surfaces 32 and 34 will slide against each other until they make full contact as shown in FIG. 7. Surfaces 32 and 34 may also be non-parallel within a small range as they approach each other. In a preferred embodiment this range is about +/−3 degrees. After first contact, as surfaces 32 and 34 slide against each other, they will be pushed together until they are flush, thus correcting for any prior non-parallel condition between them.

In this manner, the interaction of the oblique angles of printhead alignment surface 32 and guidepost alignment surface 34 not only compensates for linear misalignment of printhead 6, but also compensates for rotational misalignment of printhead 6. Since there are typically two guideposts 20, one near either end of printhead 6 (see FIGS. 1 and 3), both ends of the printhead will undergo the alignment process when the lid is closed. The amount of misalignment that can be corrected by this configuration varies somewhat with the size of the aforementioned oblique angle. Best results have been obtained with an angle of about 7–13 degrees when guidepost alignment surface 34 is measured from direction of travel 38, or about 77–83 degrees when measured from plane 36.

As shown in FIG. 7, the forward tilt of printhead 6 also causes printhead 6 to press paper 10 against platen 8 at point 40, which is several degrees forward from the point at which it would make contact if the bottom of printhead 6 were parallel to plane 36. Point 40 is actually a 'line' of contact, since it extends along the length of platen 8 and along the length of the bottom surface of printhead 6. However, in the edge view of FIG[S]. [6 and] 7, it appears as a point. The exact positioning of line of contact 40 with respect to vertical is not critical. However, the positioning of print elements 24 with respect to line of contact 40 is important. Line of contact 40 is also the area of maximum pressure between the printhead, paper and platen. Best results are typically obtained if the print elements are moved away from this line by a prescribed distance. A preferred embodiment places the print elements 0.012+/−0.010 inches forward of the line of contact 40.

As can be understood from the foregoing description, the positioning of the print elements with respect to the platen can be controlled by controlling two primary dimensions:

(1) the distance between print elements 24 and alignment surface 32 of printhead 6, and (2) the distance between alignment surface 34 of guidepost 20 and line of contact 40 on platen 8. The invention allows these dimensions to be controlled even with a certain amount of misalignment between printhead 6 and platen 8 prior to closing lid 3. This permissible misalignment allows various printer parts, such as base 2, lid 3 and hinge 4, to be made of relatively inexpensive materials with comparatively loose manufacturing tolerances. This permits the manufacture of a very inexpensive printer which is suitable for low cost uses such as label printers, adding machines, receipt printers and similar applications.

The foregoing description is intended to be illustrative and not limiting. Obvious variations will occur to those of skill in the art. For instance, the platen could be placed in the lid while the printhead is placed in the base. This and other variations are intended to be encompassed by the invention, which is limited only by the spirit and scope of the appended claims.

What is claimed is:

1. A printer, comprising:

[a base;]

a lid *pivotally* coupled to [the] *a* base[, the lid] *and* having an open [position] and [a] closed position, *the pivotal coupling defining a longitudinal axis*;

a platen [rotatably] coupled to [the] *said* base;

a *floating* printhead [assembly resiliently coupled to the] *mechanism carried by said* lid [and], *said floating*

*printhead mechanism* having a[n]*t least one* alignment surface [rigidly connected to the assembly, said printhead assembly being adapted to resiliently press against said platen] *disposed approximately at an oblique angle from a reference plane defined by said longitudinal axis and a point on the bottom of said floating printhead mechanism* when said lid is in [the] *said* closed position; and at least one [guidepost fixedly coupled to] *alignment surface on* said base[, said guidepost having an oblique guidepost alignment edge] adapted to *make parallel* contact *with* said *at least one alignment surface of said floating* printhead *mechanism* as[sembly alignment surface when] said lid is *being* closed[, whereby the contact between the oblique guidepost alignment edge and the printer alignment surface] *to* cause[s the] *said floating* printhead [assembly] *mechanism* to [resiliently] align with said platen.

2. The printer of claim 1, wherein [the] *said* platen [includes] *is* a cylindrical roller rotatably coupled to [the] *said* base.

3. The printer of claim 1, wherein said *floating* printhead [assembly] *mechanism* comprises a plurality of print elements arranged in a linear pattern[, said guidepost being adapted to align said printhead assembly with said platen in a position that the print elements are positioned in a predetermined distance from] *and positioned away from* a line of contact *defined as the area of maximum pressure* between said *floating* printhead [assembly] *mechanism* and said platen when [the] *said* lid is in [the] *said* closed position.

4. The printer of claim 3, wherein [the plurality of] *said* print elements are [a plurality of] thermal print elements.

5. The printer of claim 3, wherein [the predetermined distance is between about 2 and about 22 thousandths of an inch] *said print elements are positioned 0.012±0.010 inches forward of said line of contact.*

6. The printer of claim 1, [wherein the printhead assembly includes a spring] *further comprising means* for biasing [the] *said floating* printhead [assembly] *mechanism* toward[s the] *said* platen [and for adjusting orientation of the printhead assembly] when [the] *said* lid is in [the] *said* closed position.

7. The printer of claim 6, wherein [the spring is a leaf] *said biasing means includes at least one* spring *coupled between said lid and said printhead mechanism.*

8. The printer of claim 1, further comprising [a pair of latches respectively coupled to] *means for latching* said lid [near opposite ends, said pair of latches being adapted to latch said lid with] *to* said base [by inserting said pair of latches into corresponding latch holes on the base].

9. The printer of claim 8, [further comprising] *wherein said latching means includes* a *pair of latches coupled to said lid and adapted to engage a corresponding pair of latch recesses on said base when said lid is in said closed position and a* latch release coupled to said pair of latches [for turning said latches to release said lid from said base].

10. [The] *A* printer [of claim 1, wherein:], *comprising:*

*a base;*

[the] *a* lid [is] pivotally coupled to [the] *said* base [with] *by way of* a hinge having a longitudinal axis, *said lid having an open position and a closed position*;

[the printhead assembly alignment surface defines an oblique angle from a horizontal plane when the lid is in the closed position; and the guidepost alignment edge has approximately the same oblique angle from the horizontal plane]

*a platen rotatably coupled to said base;*

*a printhead resiliently coupled to said lid and having an alignment surface disposed at an oblique angle from a reference plane defined by said longitudinal axis and a point on the bottom of said printhead when said lid is in said closed position; and*

*at least one guidepost coupled to said base and having an alignment surface disposed approximately at the same oblique angle from said reference plane and adapted to contact said printhead alignment surface when said lid is being closed to cause said resiliently coupled printhead to align with said platen.*

11. The printer of claim 10, wherein[:] the oblique angle is [between] about 77–*83* degrees [and about 83 degrees] *when measured* from [the horizontal] *said reference* plane.

[12. The printer of claim 1, wherein the printer comprises two guideposts respectively positioned on said base near opposite ends of said printhead assembly when said lid is closed, said guideposts each having an oblique guidepost alignment edge respectively contacting and aligning said printhead assembly against said platen.]

[13. A method of aligning a printhead with a platen in a printer, comprising the steps of:

closing a printer lid onto a printer base;

moving a printhead towards a platen when the lid is being closed;

contacting a printhead alignment edge with a guidepost alignment edge before the lid closes; and aligning the printhead with the platen by the step of contacting.]

*14. A printhead alignment system, comprising:*

(*a*) *a base;*

(*b*) *a lid adapted to close onto said base;*

(*c*) *a platen operatively coupled to said base;*

(*d*) *a printhead assembly adapted to float within said lid, said floating printhead assembly adapted to descend over said platen in a substantially linear direction of travel immediately before said lid closes onto said base; said floating printhead assembly including at least one alignment surface disposed at an oblique angle relative to said direction of travel, said printer base being adapted to make parallel contact with said at least one alignment surface to cause said printhead assembly to align with said platen.*

*15. A printhead alignment system, comprising:*

(*a*) *a base;*

(*b*) *a lid adapted to close onto said base;*

(*c*) *a platen operatively coupled to said base;*

(*d*) *a printhead assembly adapted to float within said lid, said floating printhead assembly adapted to descend over said platen in a substantially linear direction of travel immediately before said lid closes onto said base, said floating printhead assembly including a first alignment surface disposed at an oblique angle relative to said direction of travel, said printer base including a second alignment surface adapted to make parallel contact with said first alignment surface to cause said printhead assembly to align with said platen.*

*16. A printhead alignment system, comprising:*

*a base;*

*a lid pivotally coupled at one end to said base by way of a hinge having a longitudinal axis, said lid having an open position and a closed position;*

*a platen rotatably coupled to said base;*

*a printhead resiliently coupled to said lid and having a first surface facing away from said pivotally coupled*

*end and being disposed at an oblique angle from a reference plane defined by said longitudinal axis and a point on the bottom of said printhead when said lid is in said closed position; and*

*at least one printhead alignment surface on said base disposed approximately at the same oblique angle from said reference plane and adapted to contact said first surface of said printhead as said lid is being closed to cause said resiliently coupled printhead to align with said platen.*

*17. A printhead alignment system, comprising:*

*a base;*

*a lid pivotally coupled at one end to said base by way of a hinge having a longitudinal axis, said lid having an open position and a closed position;*

*a platen rotatably coupled to said base;*

*a printhead resiliently coupled to said lid and having a first surface facing away from said pivotally coupled end and being disposed at an oblique angle from a reference plane defined by said longitudinal axis and a point on the bottom of said printhead when said lid is in said closed position; and*

*at least two printhead alignment surfaces on said base disposed respectively near opposite ends of said printhead when said lid is in said closed position and approximately at the same oblique angle from said reference plane and adapted to contact said first surface of said printhead as said lid is being closed to cause said resiliently coupled printhead to align with said platen.*

*18. The printer of claim 3, wherein the positioning of said print elements with respect to said platen is controlled by the distance between said print elements and said at least one alignment surface of said floating printhead mechanism, and the distance between said at least one alignment surface on said base and said line of contact.*

* * * * *